United States Patent
Jung

(10) Patent No.: US 10,153,463 B2
(45) Date of Patent: Dec. 11, 2018

(54) RECHARGEABLE BATTERY

(71) Applicant: Samsung SDI Co., LTD., Yongin-si, Gyeonggi-do (KR)

(72) Inventor: Kang-Kook Jung, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 316 days.

(21) Appl. No.: 14/944,044

(22) Filed: Nov. 17, 2015

(65) Prior Publication Data

US 2016/0149167 A1    May 26, 2016

(30) Foreign Application Priority Data

Nov. 26, 2014    (KR) .................. 10-2014-0166522

(51) Int. Cl.
| | | |
|---|---|---|
| *H01M 4/00* | (2006.01) | |
| *H01M 2/02* | (2006.01) | |
| *H01M 2/04* | (2006.01) | |
| *H01M 2/10* | (2006.01) | |

(52) U.S. Cl.
CPC ........... *H01M 2/02* (2013.01); *H01M 2/0202* (2013.01); *H01M 2/0237* (2013.01); *H01M 2/043* (2013.01); *H01M 2/0404* (2013.01); *H01M 2/1022* (2013.01); *H01M 2/1077* (2013.01);
(Continued)

(58) Field of Classification Search
CPC ................. H01M 2/02; H01M 2/0202; H01M 2/0237; H01M 2/0404; H01M 2/043; H01M 2/1022; H01M 2/1077; H01M 2220/30; H01M 2220/20; H01M 2002/0205

See application file for complete search history.

(56) References Cited

U.S. PATENT DOCUMENTS

| | | | |
|---|---|---|---|
| 6,610,441 B2 * | 8/2003 | Hensley | .................. E21B 17/10 |
| | | | 429/161 |
| 9,379,410 B2 | 6/2016 | Thompson et al. | |
| | (Continued) | | |

FOREIGN PATENT DOCUMENTS

| | | | |
|---|---|---|---|
| JP | 2006156049 A | * | 6/2006 |
| KR | 10-2007-0081549 A | | 8/2007 |
| | (Continued) | | |

OTHER PUBLICATIONS

U.S. Office Action dated Oct. 2, 2018 for U.S. Appl. No. 14/944,129, which cites the above-identified references numbered 1-4 and which is related to subject U.S. Appl. No. 14/944,044.

*Primary Examiner* — Jane J Rhee
(74) *Attorney, Agent, or Firm* — Knobbe Martens Olson & Bear LLP

(57) ABSTRACT

A rechargeable battery is disclosed. In one aspect, the battery includes an electrode assembly including a first electrode and a second electrode wound with a separator interposed between the first and second electrodes and a case accommodating the electrode assembly. The battery also includes a cap assembly including a cap plate coupled to the case to close an opening formed on one side of the case, a first terminal placed at the cap plate and electrically connected to the first electrode, and a second terminal placed at the cap plate and electrically connected to the second electrode. The case includes a concave portion formed on one outer surface.

19 Claims, 4 Drawing Sheets

(52) U.S. Cl.
CPC ............... *H01M 2002/0205* (2013.01); *H01M 2220/20* (2013.01); *H01M 2220/30* (2013.01)

(56) References Cited

U.S. PATENT DOCUMENTS

| | | | |
|---|---|---|---|
| 2006/0063067 A1* | 3/2006 | Kim ..................... | H01M 2/021 429/148 |
| 2012/0183825 A1 | 7/2012 | Lee et al. | |
| 2016/0043355 A1 | 2/2016 | Byun et al. | |

FOREIGN PATENT DOCUMENTS

| | | | |
|---|---|---|---|
| KR | 10-2012-0082808 A | 7/2012 |
| KR | 10-2013-0016746 A | 2/2013 |
| KR | 10-2014-0019241 A | 2/2014 |
| KR | 10-2016-0019314 A | 2/2016 |

* cited by examiner

RECHARGEABLE BATTERY

INCORPORATION BY REFERENCE TO ANY PRIORITY APPLICATIONS

This application claims priority to and the benefit of Korean Patent Application No. 10-2014-0166522 filed in the Korean Intellectual Property Office on Nov. 26, 2014, the entire contents of which are incorporated herein by reference.

This application relates to U.S. patent application entitled "METHOD OF MANUFACTURING RECHARGEABLE BATTERY WITH CURVED SURFACE" Ser. No. 14/944,129, which is concurrently filed as this application and incorporated herein by reference in its entirety.

BACKGROUND

Field

The described technology generally relates to a rechargeable battery.

Description of the Related Technology

Rechargeable batteries can be repeatedly charged and discharged, unlike primary batteries. Low-capacity rechargeable batteries are used for small, portable electronics such as mobile phones, laptop computers, or camcorders, and large-capacity rechargeable batteries are widely used for power sources for driving motors of electric bicycles, scooters, electric vehicles, forklifts, etc.

A rechargeable battery includes an electrode assembly formed by laminating a positive electrode and a negative electrode, with a separator interposed between them, and winding them in a jelly-roll shape, a case that contains the electrode assembly together with an electrolyte solution, a cap plate that seals an opening on one side of the case, and an electrode terminal installed at the cap plate and electrically connected to the electrode assembly.

Electronic devices may be manufactured to have a curved surface. On the contrary, batteries, which are energy-supplying devices, often require changes in shape or the addition of unwanted shapes as they are not manufactured in a way that conforms to the shape of an electronic device with a curved surface.

The above information disclosed in this Background section is only for enhancement of understanding of the described technology and therefore it may contain information that does not constitute prior art.

SUMMARY OF CERTAIN INVENTIVE ASPECTS

One inventive aspect is a rechargeable battery which contains a plurality of electrode assemblies.

Another aspect is a rechargeable battery which includes a case that contains a plurality of electrode assemblies and has curved portions on an outer surface and another outer surface so as to conform to the shape of an electronic device with a curved surface.

Another aspect is a rechargeable battery including: an electrode assembly formed by winding a first electrode and a second electrode, with a separator interposed between the first and second electrodes; a case that contains the electrode assembly; and a cap assembly including a cap plate coupled to the case to seal or close an opening on one side of the case, a first terminal installed at the cap plate and electrically connected to the first electrode, and a second terminal installed at the cap plate and electrically connected to the second electrode, wherein the case may include a first curved portion which is made concave on one outer surface.

The case may include a second curved portion which is made convex on another outer surface, and the first curved portion and the second curved portion may bend in the same direction.

A plurality of electrode assemblies may be contained within the case.

The electrode assemblies may be contained within the case in such a way as to be arranged in succession in a direction from the first terminal to the second terminal.

The case may further include connecting portions that connect the first and second curved portions, and each electrode assembly may be firmly attached to and contained in the internal space of the case, being in contact with the inside surfaces of the first and second curved portions and the inside surface of one of the connecting portions.

The connecting portions may have a rounded shape.

Another aspect is a rechargeable battery module including a plurality of rechargeable batteries each containing a plurality of electrode assemblies in a case having a first curved portion and a second curved portion, wherein the rechargeable batteries may be connected together by arranging the first curved portions and the second curved portions in succession.

The first curved portion may be made concave on one outer surface of the rechargeable battery, and the second curved portion may be made convex on another outer surface of the rechargeable battery.

The case may further include connecting portions that connect the first and second curved portions, and the rechargeable batteries may be connected together as the connecting portions come into contact with each other.

The connecting portions may have a rounded shape.

The rechargeable batteries may be connected together in a ring shape.

Another aspect is a rechargeable battery comprising: an electrode assembly including a first electrode and a second electrode wound with a separator interposed between the first and second electrodes; a case accommodating the electrode assembly; and a cap assembly comprising a cap plate coupled to the case to close an opening formed on one side of the case, a first terminal placed at the cap plate and electrically connected to the first electrode, and a second terminal placed at the cap plate and electrically connected to the second electrode, wherein the case comprises a concave portion formed on one outer surface.

In the above battery, the case comprises a convex portion formed on another outer surface, and the concave and convex portions bend in the same direction. In the above battery, the electrode assembly comprises a plurality of electrode assemblies. In the above battery, at least two of the electrode assemblies are arranged to cross each other. In the above battery, the electrode assemblies are arranged inside the case in a direction from the first terminal to the second terminal. In the above battery, the case further comprises a plurality of connecting portions that connect the concave and convex portions, and wherein each of the electrode assemblies contacts inner surfaces of the connection portions and inner surfaces of the concave and convex portions. In the above battery, each of the electrode assemblies includes a curved portion that contacts at least one of the connection portions. In the above battery, the connecting portions are non-linear. In the above battery, the connecting portions are curved.

Another aspect is a rechargeable battery module comprising: a plurality of rechargeable batteries each containing a plurality of electrode assemblies accommodated in a case having first and second curved portions formed on outer surfaces thereof, wherein the rechargeable batteries are connected together to form a closed loop.

In the above battery module, the first curved portion is concave, and wherein the second curved portion is convex. In the above battery module, the convex portions of the rechargeable batteries surround the concave portions of the rechargeable batteries. In the above battery module, the case further comprises a plurality of connecting portions interconnecting the first and second curved portions, and wherein the connecting portions of each rechargeable battery are connected to those of adjacent rechargeable batteries. In the above battery module, the connecting portions have a curved shape. In the above battery module, the rechargeable batteries are connected together to form a ring shape.

Another aspect is a rechargeable battery comprising: at least one electrode assembly including first and second electrodes wound with a separator interposed between the first and second electrodes; and a case accommodating the electrode assembly, wherein the case includes first and second outer surfaces opposing each other, and third and fourth outer surfaces opposing each other, wherein the first and second outer surfaces are greater in area than the third and fourth outer surfaces, and wherein one of the first and second outer surfaces is concave.

In the above battery, the case comprises a convex portion formed on the other of the first and second outer surfaces, and wherein the concave and convex portions bend in the same direction. In the above battery, the electrode assembly comprises a plurality of electrode assemblies, and wherein at least two of the electrode assemblies are arranged to cross each other. In the above battery, the case further comprises a plurality of connecting portions interconnecting the concave and convex portions, and wherein each of the electrode assemblies contacts inner surfaces of the connection portions and inner surfaces of the concave and convex portions. In the above battery, the connecting portions are curved.

According to at least one of the disclosed embodiments, a rechargeable battery can be manufactured in a way that conforms to the shape of an electronic device with a curved surface because a plurality of electrode assemblies are contained within a case with first and second curved portions while being wound together but without being bent.

Moreover, the wound electrode assemblies can be secured to the inside of the case without a securing member when they are inserted between the first and second curved portions within the case, thus cutting down the cost of manufacturing rechargeable batteries.

Furthermore, a rechargeable battery module, formed by connecting a plurality of rechargeable batteries each having a case with first and second curved portions, takes up less installation space, giving an advantage in terms of space use.

DETAILED DESCRIPTION CERTAIN INVENTIVE EMBODIMENTS

Figure 1:
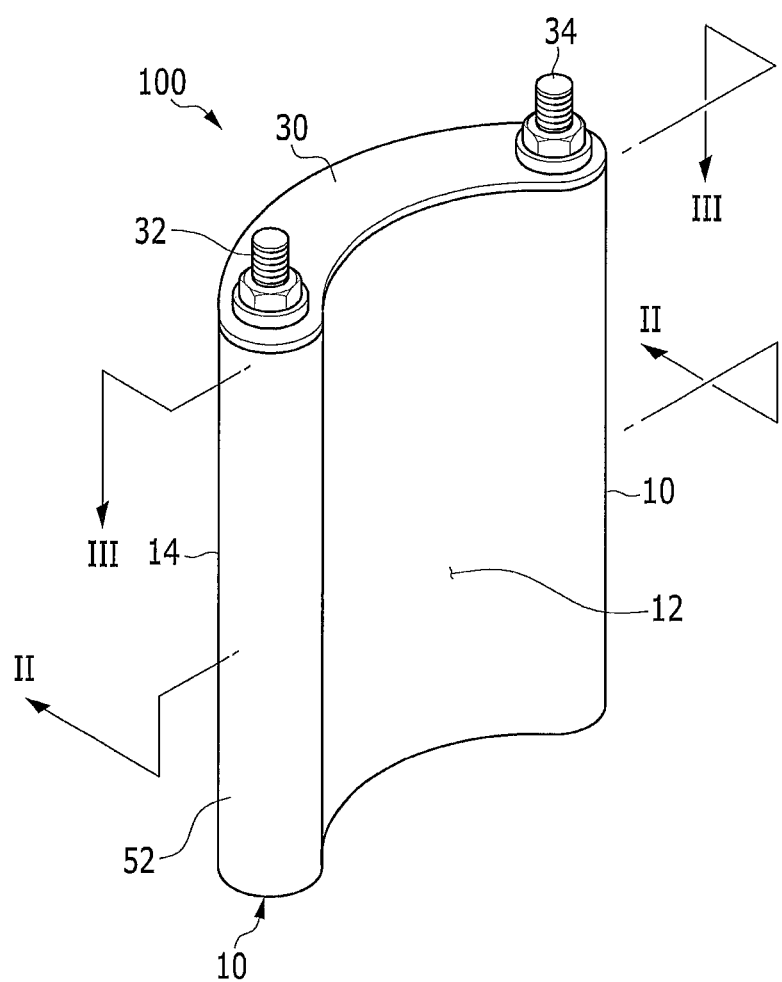
FIG. 1 is a perspective view of a rechargeable battery according to an exemplary embodiment.

Embodiments will be described more fully hereinafter with reference to the accompanying drawings. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, the size and thickness of each component shown in the drawings are arbitrarily shown for understanding and ease of description, but the present invention is not limited thereto. In this disclosure, the term "substantially" includes the meanings of completely, almost completely or to any significant degree under some applications and in accordance with those skilled in the art. Moreover, "formed on" can also mean "formed over." The term "connected" includes an electrical connection.

FIG. 1 is a perspective view of a rechargeable battery according to an exemplary embodiment.

Referring to FIG. 1, a rechargeable battery 100 includes a case 10 connected to a cap assembly with a first terminal 32 and a second terminal 34 coupled to a cap plate 30, and a plurality of electrode assemblies 20 (shown in FIG. 2) within the case 10. In some embodiments, the case 10 includes a first curved portion 12 which is made concave on an outer surface and a second curved portion 14 (shown in FIG. 3) which is made convex on another outer surface.

An electrode assembly 20 contained within the case 10 is formed by winding a first electrode, a separator, and a second electrode together. A first electrode tab 22 and a second electrode tab 24 are attached to the first and second electrodes of the electrode assembly 20, respectively, and electrically connected to electrode terminals 32 and 34 through connecting members 40 and 42 to be described later, respectively. The number of turns of the electrode assembly 20 is determined depending on battery capacity and the size of the case 10.

The first and second curved portions 12 and 14 of the case 10 are arranged side by side and bend in the same direction. Accordingly, the outer appearance of the rechargeable battery 100 has an overall bent structure. The degree of curvature of the first and second curved portions 12 and 14 of the rechargeable battery 100 may vary depending on the shape of an electronic device, etc.

Figure 2:
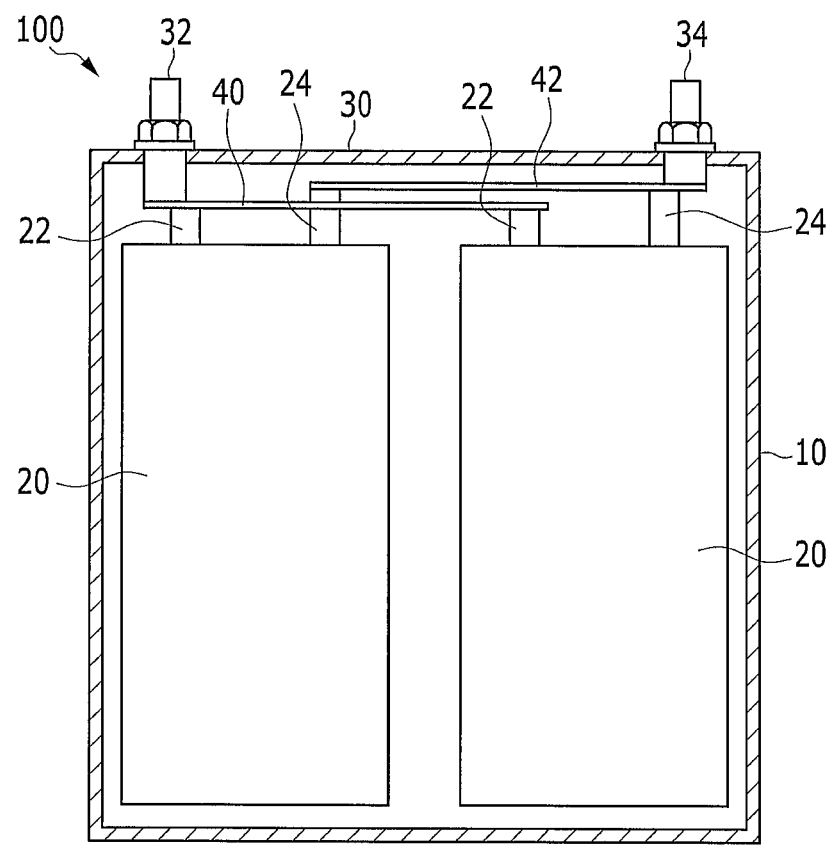
FIG. 2 is a cross-sectional view taken along line II-II of FIG. 1.

FIG. 2 is a cross-sectional view taken along line II-II of FIG. 1.

Referring to FIG. 2, in the rechargeable battery 100 of the present exemplary embodiment, two electrode assemblies 20 are contained within the case 10 in such a way as to be arranged in succession in a direction from the first terminal 32 to the second terminal 34.

The first and second electrode tabs 22 and 24 are formed on the left and right sides of each electrode assembly 20, and the electrode tabs of the same polarity of the two electrode assemblies 20 are connected to the first and second terminals 32 and 34 of the cap assembly via the connecting members 40 and 42.

The electrode assemblies 20 may be contained within the case 10 while being wound together but without being bent any further. If the electrode assemblies 20 are contained in the case 10 while bent, the upper and lower surfaces of each electrode assembly 20 differ in length and stress is applied to the shortened lower surface, causing deterioration after repetitive charging and discharging. Such deterioration may reduce battery life and cause active materials to be removed from the bent current collector. Accordingly, as is the case with the rechargeable battery 100 according to the exemplary embodiment, a plurality of electrode assemblies 20 are contained within the case 10 with curved portions, while being wound together but without being bent any further, thereby solving the aforementioned problems expected to occur when the electrode assemblies 20 listed above are contained while bent.

Figure 3:
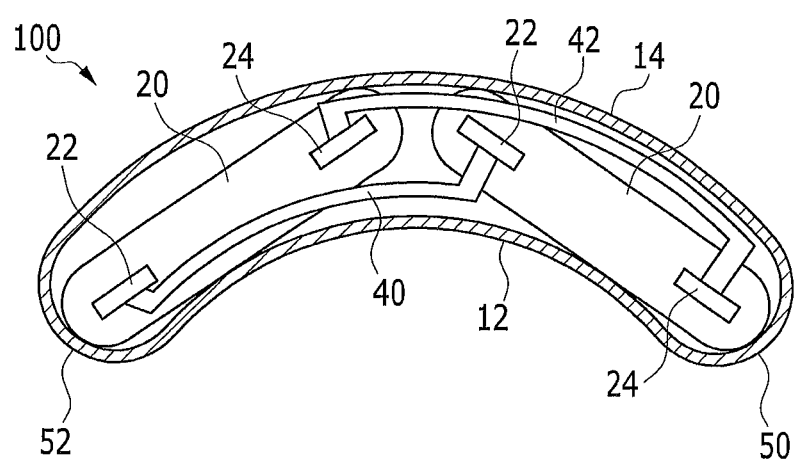
FIG. 3 is a cross-sectional view taken along line of FIG. 1.

FIG. 3 is a cross-sectional view taken along line of FIG. 1.

Referring to FIG. 3, the electrode assemblies 20 arranged in succession in a direction from the first terminal 32 to the second terminal 34 of the cap assembly are arranged along the internal space of the case 10 while coming into contact with the inside surfaces of the first and second curved portions 12 and 14 of the case 10. Moreover, the electrode assemblies 20 may be contained, separate from each other.

The case 10 may further include connecting portions 50 and 52 that connect the first and second curved portions 12 and 14. The connecting portions 50 and 52 may have a rounded shape. To prevent the two electrode assemblies 20 from moving within the case 10, each electrode assembly 20 may be firmly attached to the internal space, being in contact with the inside surfaces of the first and second curved portions 12 and 14 of the case 10 and the inside surface of one of the connecting portions 50 and 52. The electrode assemblies 20 may be firmly secured within the case 10. As the electrode assemblies 20 are firmly attached and secured to the inside surface of the case 10, they can be secured without a securing member. Accordingly, the electrode assemblies 20 are secured to the inside of the case 10 without a securing member when they are inserted between the first and second curved portions 12 and 14 within the case 10. Because of the omission of securing members, battery manufacturing costs are reduced.

The connecting member 40 that connects the first electrode tabs 22 may be connected to the first electrode terminal 32 along the first curved portion 12 of the case 10 which is made concave. The connecting member 42 that connects the second electrode tabs 24 may be connected to the second electrode terminal 34 along the second curved portion 14 of the case 10 which is made convex.

Figure 4:
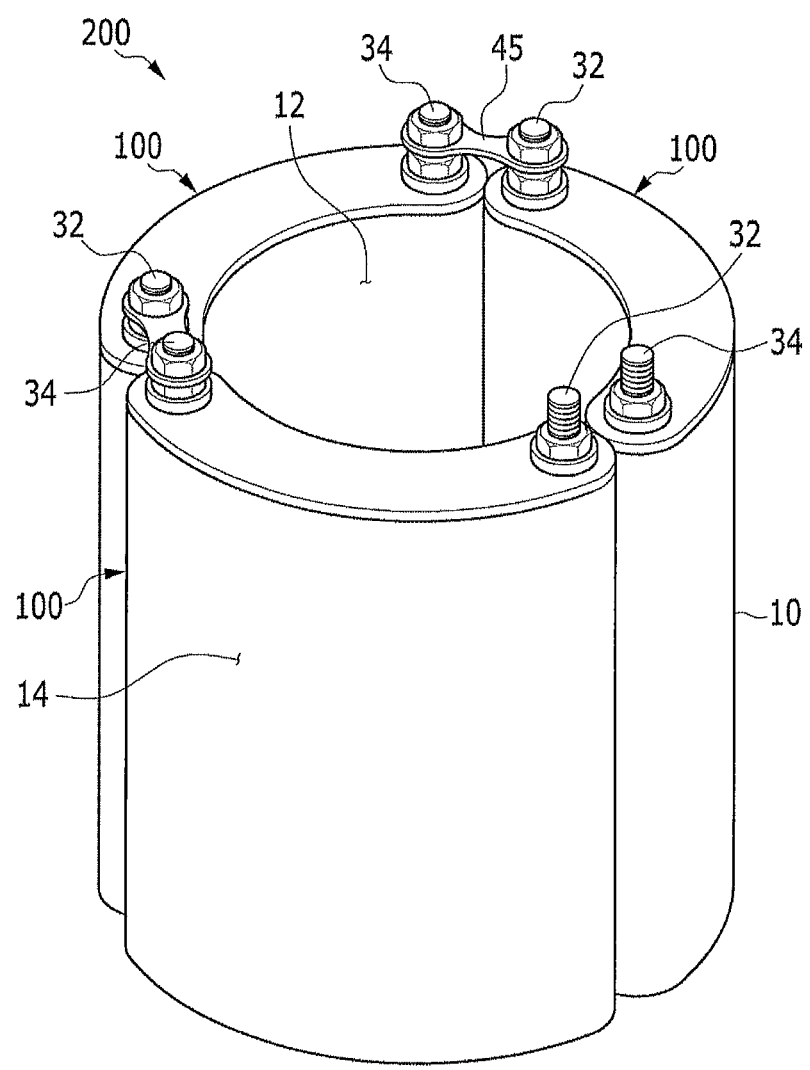
FIG. 4 is a perspective view of a rechargeable battery module according to an exemplary embodiment.

FIG. 4 is a perspective view of a rechargeable battery module according to an exemplary embodiment.

Referring to FIG. 4, a plurality of rechargeable batteries 100 each including a first curved portion 12 and a second curved portion 14 may be connected together to form a rechargeable battery module 200

The first curved portion 12 may be made concave on one outer surface of the rechargeable battery 100, and the second curved portion 14 may be made convex on another outer surface of the rechargeable battery 100. Both of the first and second curved portions 12 and 14 of the rechargeable battery 100 may include connecting portions 50 and 52 which have a rounded shape.

In the rechargeable battery module 200 of the present exemplary embodiment, the first and second curved portions 12 and 14 of different rechargeable batteries 100 may be arranged in succession. For example, if the first curved portions 12 of different rechargeable batteries 100 become adjacent to each other, they form a closed surface, allowing the rechargeable battery module 200 to be shaped like a ring.

As the connecting portions 50 and 52 come into close contact with each other, the rechargeable batteries 100 are connected together by coupling the electrode terminals 32 and 34 via, for example, bus bars.

The size of the rechargeable battery module 200 and the number of rechargeable batteries 100 are determined according to user's requirements, so the described technology is not limited to connecting three rechargeable batteries 100. For example, four or more rechargeable batteries can be connected to each other to form a battery module. Furthermore, different rechargeable batteries 100 adjacent to each other can be connected in series by connecting their first and second terminals 32 and 34.

For example, if the rechargeable battery module 200 of the present exemplary embodiment is applied to a motor, the rechargeable battery module 200 can be installed in such a way as to enclose the main body of the motor. This makes the rechargeable battery module 200 appear to be integral with the motor, offering a better aesthetic appearance. Also, a space for the rechargeable battery module 200 is not needed, giving an advantage in terms of space use. A secondary advantage is that rechargeable batteries capable of charging and discharging are installed adjacent to the motor, thus leading to a reduction of loss caused by a long distance between the rechargeable batteries and the motor.

In another example, if installed on the hub of a wind turbine, can be used for the purposes of supplying necessary electric power to the nacelle of the wind turbine when the wind turbine is in the stopped state and storing electricity generated by the wind turbine when it is operating. As rechargeable batteries can be installed near the rotor shaft of a wind turbine, this eliminates the need for a space for installing the rechargeable battery module 200 within the nacelle, giving an advantage in terms of space use.

In yet another example, if installed along the outer circumference of a wheel of a vehicle, eliminates the need for a conventional storage space for rechargeable batteries stored in the main body of an electric vehicle or hybrid vehicle, thereby making it easy to design the interior of the electric vehicle or hybrid vehicle.

While the inventive technology has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly including a first electrode and a second electrode wound with a separator interposed between the first and second electrodes;
   a case accommodating the electrode assembly; and
   a cap assembly comprising a cap plate coupled to the case to close an opening formed on one side of the case, a first terminal placed at the cap plate and electrically connected to the first electrode, and a second terminal placed at the cap plate and electrically connected to the second electrode,
   wherein the case comprises a concave portion formed on one outer surface, and
   wherein the first and second terminals are positioned on opposing sides of the cap plate,
   wherein the electrode assembly comprises first and second electrode assemblies, wherein each of the electrode assemblies comprises first and second tabs, and wherein the first terminal is connected to the first tabs of the first and second electrode assemblies.

2. The rechargeable battery of claim 1, wherein the case comprises a convex portion formed on another outer surface, and the concave and convex portions bend in the same direction.

3. The rechargeable battery of claim 1, wherein the electrode assemblies are arranged to cross each other.

4. The rechargeable battery of claim 1, wherein the electrode assemblies are arranged inside the case in a direction from the first terminal to the second terminal.

5. The rechargeable battery of claim 1, wherein the case further comprises a plurality of connecting portions that connect the concave and convex portions, and wherein each of the electrode assemblies contacts inner surfaces of the connection portions and inner surfaces of the concave and convex portions.

6. The rechargeable battery of claim 5, wherein each of the electrode assemblies includes a curved portion that contacts at least one of the connection portions.

7. The rechargeable battery of claim 5, wherein the connecting portions are non-linear.

8. The rechargeable battery of claim 7, wherein the connecting portions are curved.

9. A rechargeable battery module comprising:
a plurality of rechargeable batteries each containing a plurality of electrode assemblies accommodated in a case having first and second curved portions formed on outer surfaces thereof, wherein each of the rechargeable batteries includes first and second terminals placed on a top surface of the respective case, and wherein the rechargeable batteries are connected together via the first and second terminals to form a closed loop.

10. The rechargeable battery module of claim 9, wherein the first curved portion is concave, and wherein the second curved portion is convex.

11. The rechargeable battery module of claim 10, wherein the convex portions of the rechargeable batteries surround the concave portions of the rechargeable batteries.

12. The rechargeable battery module of claim 9, wherein the case further comprises a plurality of connecting portions interconnecting the first and second curved portions, and wherein the connecting portions of each rechargeable battery are connected to those of adjacent rechargeable batteries.

13. The rechargeable battery module of claim 12, wherein the connecting portions have a curved shape.

14. The rechargeable battery module of claim 12, wherein the rechargeable batteries are connected together to form a ring shape.

15. A rechargeable battery comprising:
at least one electrode assembly including first and second electrodes wound with a separator interposed between the first and second electrodes; and
a case accommodating the electrode assembly,
wherein the case includes first and second outer surfaces opposing each other, and third and fourth outer surfaces opposing each other, wherein the first and second outer surfaces are greater in area than the third and fourth outer surfaces, wherein one of the first and second outer surfaces is concave, and wherein the third and fourth outer surfaces are curved.

16. The rechargeable battery of claim 15, wherein the case comprises a convex portion formed on the other of the first and second outer surfaces, and wherein the concave and convex portions bend in the same direction.

17. The rechargeable battery of claim 15, wherein the electrode assembly comprises a plurality of electrode assemblies, and wherein at least two of the electrode assemblies are arranged to cross each other.

18. The rechargeable battery of claim 17, wherein the case further comprises a plurality of connecting portions interconnecting the concave and convex portions, and wherein each of the electrode assemblies contacts inner surfaces of the connection portions and inner surfaces of the concave and convex portions.

19. The rechargeable battery of claim 18, wherein the connecting portions are curved.

* * * * *